Patented Dec. 27, 1938

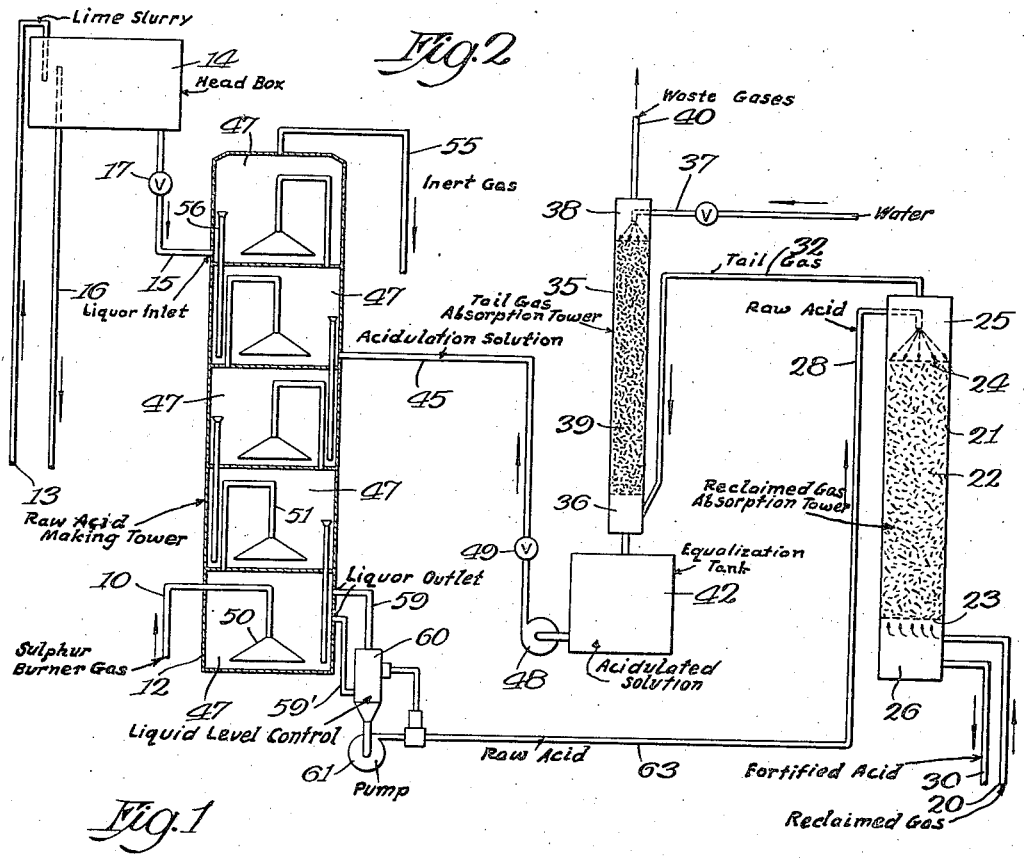
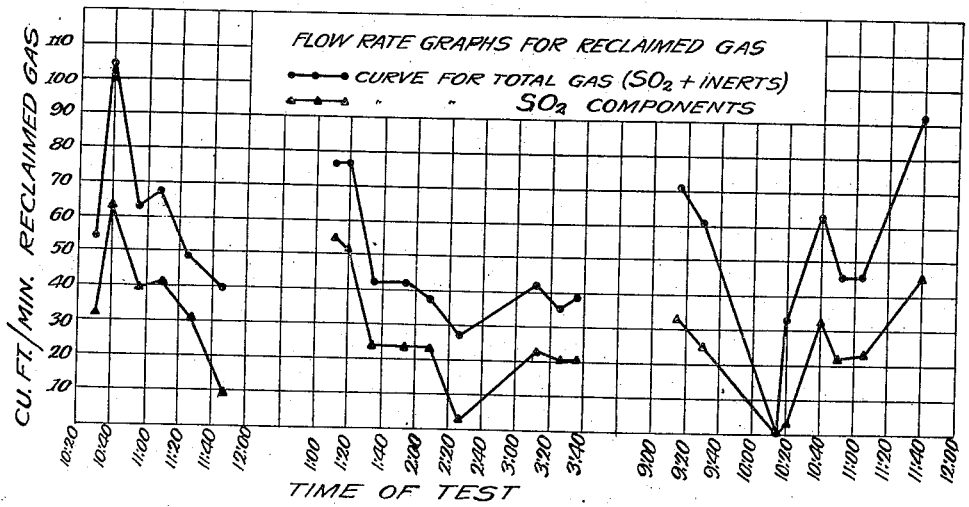

2,141,886

UNITED STATES PATENT OFFICE 2,141,886

RECLAIMED GAS RECOVERY PROCESS

Walter H. Swanson, Neenah, and Donald C. Porter, Appleton, Wis., assignors to Paper Patents Company, Neenah, Wis., a corporation of Wisconsin Application October 11, 1935, Serial No. 44,578

1 Claim. (Cl. 23—131)

Our invention relates broadly to the recovery of gases and while it may have numerous industrial applications, we have found it to be of special value in connection with the digestion of pulp in paper manufacturing processes wherein gaseous digesting agents are used. Particular reference is had to the sulphite process wherein sulphur dioxide is used. Our invention will be described, therefore, with particular reference to the sulphite process, although it will be understood that the invention is equally applicable to various other processes.

In the normal sulphite pulping process, one phase of the cooking operation is a more or less continuous removal of so-called relief gas from the digesters, in order to maintain a predetermined pressure schedule, this gas consisting mainly of sulphur dioxide with lesser proportions of carbon dioxide, water vapor, oxygen and nitrogen. In the interest of economical operation it is necessary to recover the sulphur dioxide component and eliminate the others.

The usual procedure in the recovery process is to bubble the relief gas through a relatively unsaturated water solution of sulphur dioxide and the bisulphite of an alkaline earth metal such as calcium, retained in large storage tanks or vessels, the weak solution being supplied continuously from the main acid-making process and usually referred to as "system" or "raw" acid. As a result of this bubbling process, the sulphur dioxide component is dissolved in the weak acid to a point approaching saturation or equilibrium, this point being determined by the temperature and pressure at which the system is operating. The relatively insoluble components of the gas, such as carbon dioxide, oxygen and nitrogen, pass through the solution and accumulate in the gas space over its surface.

Inasmuch as all of the sulphur dioxide is not retained in the solution of raw acid, a certain proportion thereof, corresponding to its partial pressure at the temperature of the solution, accumulates along with the waste gases above the solution. As this mixture of gases is continually accumulating and contains a valuable sulphur dioxide component which is appreciable in amount, it is desired to recover the said component for re-utilization in the pulp digesting process. It is this component which is usually referred to as "reclaimed gas" in the sulphite pulping process.

The attempts which have been made to recover this reclaimed gas in the past have been unsatisfactory, inefficient and uneconomical for reasons which will be discussed below.

The particular object of our invention is, therefore, to provide an improved system for recovering reclaimed gas of the sulphite process, as well as of other processes, which will be economical and efficient and will have numerous other advantages which will become apparent as the description proceeds.

In the drawing forming part of this specification—

Fig. 1 is a series of graphs illustrating certain problems relating to the present invention and which will be discussed below, and Fig. 2 is a diagrammatic flow sheet illustrating our invention.

Fig. 1 represents the flow of reclaimed gas as shown by data obtained under operating conditions from an average sized sulphite pulping mill, the ordinates representing the amount of flow and the abscissae the time. It will be seen that three runs are represented, each by a pair of curves, the uppermost curve in each case representing the total gas flow, while the lowermost represents the $SO_2$ component of the corresponding total flow curve. These graphs clearly show a wide fluctuation in the rate of flow and also show that the $SO_2$ component is by no means parallel or proportionate to the total, in many instances diverging widely therefrom. The flow rate may vary from a minimum of zero to a maximum of more than 10% of the volume of burner gas flowing to the system, and, since the concentrations of its components also vary over wide ranges, the quantity of sulphur dioxide introduced into the acid-making system from reclaimed gas may vary up to a maximum of 25% of that being supplied by the sulphur burning system, and such fluctuations occur over relatively short intervals of time.

Such fluctuations produce many adverse effects in the recovery processes heretofore employed, especially when the reclaimed gas is introduced into the stream of burner gas flowing to the acid-making equipment. Without going into too great detail, it may be said that proper adjustment of the sulphur burning apparatus is extremely difficult or impossible, and when said apparatus is adjusted as well as it may be, ill effects inevitably occur due to the fluctuations referred to. Such effects may consist in sublimation of sulphur in the cooling system, causing "plugging", when insufficient oxygen is being drawn through the burner, or, at the other extreme, a reduction in the concentration of the resulting gas when there is an excess of oxygen, thus lowering the efficiency of the acid-making equipment. Still another effect of the fluctuations may be undesirable side reactions such as the formation of sulphuric acid and sulphates, which are of no value or are actually detrimental to the cooking process and result in economic loss.

Our invention results in the introduction of reclaimed gas into the acid-making system at a substantially steady rate and constant concentration, thus eliminating the disadvantages of the prior practices above referred to.

Referring now to Fig. 2, burner gas, as sulphur dioxide, is introduced from the sulphur burners through a conduit 10 into a tower 12 which functions as an absorber therefor. Lime slurry is fed through a conduit 13 into a head box 14 and thence through a conduit 15 into the tower 12. An overflow pipe 16 is provided for the head box 14 and a valve 17 may be provided in the pipe 15.

The reclaimed gas from the cookers, as defined above, enters the system through a pipe 20, flowing into an absorption tower 21. This tower is packed with chemical stoneware as shown at 22 above a perforated partition 23 spaced from the bottom of the tank, a similar partition 24 being provided at a distance from the top of the tank so as to provide a space 25 at the top and a space 26 at the bottom.

System acid is introduced into the tower 21 by means of conduit 28, said acid being sprayed into chamber 25 at the top of the tower and flowing down over the ceramic material 22 against a counterflow of reclaimed gas, the fortified acid leaving the chamber 26 by a conduit 30, whence it flows to a suitable storage receptacle.

The tail gases from tower 21 which are not absorbed by the system acid escape from chamber 25 at the top of the tower through conduit 32 into a tail gas recovery tower 35. This tower is constructed similarly to the tower 21, the tail gas entering a space 36 at the base of the tower, while a relatively small quantity of water is introduced via conduit 37 into a chamber 38 at the top thereof and flowing down through stoneware 39 against a counterflow of the gas. The waste gases, such as carbon dioxide, nitrogen and oxygen are emitted at the top through a vent 40, while the recovered sulphur dioxide component of the tail gases absorbed in water flow out at the bottom into an equalizer tank 42. This equalizer tank should have sufficient capacity to hold the acidulated water delivered from the tail gas tower over the period from one relief gas flow peak to the next. Inasmuch as the concentration of the liquid leaving tower 35 will vary from minute to minute with the variation in tail gas concentration entering the tower, although its average concentration will be quite constant, it is desirable to have it equalized before introducing it into the acid-making system. In this way the wide fluctuations discussed above and illustrated in the graphs of Fig. 1, are compensated for, and the disadvantages of the prior practices are obviated.

The introduction of the acidulated water from the equalizing system into the acid-making system proper depends on the nature of the latter. If it is the conventional tower system, the acidulated water is incorporated with the acid from the so-called "weak tower", the mixture being delivered to the "strong tower" in the conventional manner. If, on the other hand, the milk of lime system as shown in Fig. 2 is employed, the acidulated water is introduced, as through a conduit 45, into an intermediate compartment 47 of the tower, for example the second or third from the top. A pump 48 may be employed in the line 45 for conveying the acidulated water from the equalizer tank 42 to the tower 12, and the flow may be regulated by a valve 49.

The acidulated water from the equalizer tank should be introduced at a point below the liquor inlet of the raw acid tower and intermediate the liquor inlet and outlet thereof. The introduction of the acidulated solution into the raw acid tower system prior to the liquor inlet thereof has been found unsatisfactory as the sulphur burner gases introduced near the bottom of the tower strip or sweep the dissolved sulphur dioxide from the acidulated solution resulting in a loss of sulphur dioxide at the inert gas outlet located at the top of the tower. On the other hand, the introduction of the acidulated solution from the equalizer tank into the raw acid tower system subsequent to the liquor outlet thereof has been found unsatisfactory due to the dilution of the raw acid liquor. To obtain the advantages of our invention, the acidulated solution should be introduced into the raw acid tower intermediate the liquor inlet and outlet thereof as above described and illustrated in Figure 2.

It will be seen that the burner gas which is introduced into the tower through the conduit 10 is emitted from a diffuser 50 and is drawn into the next overlying chamber, below the level of the liquid therein, through a U-pipe 51, this process being repeated successively until the gas has reached the uppermost chamber whence the residual inert gas is drawn off through conduit 55 by means of a vacuum pump or other suitable means (not shown). Overflow tubes 56 are provided for conveying the fluid from one compartment 47 to the next one therebelow.

The system acid produced in tower 12 is withdrawn from the lowermost chamber 47 by pipes 59, 59', through a liquid level controller 60, by means of a pump 61 whence it is forced through a conduit 63 to the top of the recovery tower 21. As stated above, the acid after passing through this tower and being fortified therein is conveyed through the conduit 30 to storage means.

The system described above is simple and lends itself readily to accurate design on the basis of sound chemical engineering principles. It accomplishes the desired result, namely, the improvement of operating conditions in the conventional sulphite acid plant in that it eliminates the undesirable fluctuations caused by variable flow rates of reclaimed gas.

Modifications and variations coming within the spirit of our invention will no doubt suggest themselves to those skilled in the art, and hence we do not wish to be limited to the embodiments herein described or uses mentioned, but intend that the scope of our invention shall be determined from the appended claims, which are to be interpreted as broadly as the state of the art will permit.

We claim:

The steps in an improved method of recovering sulphur dioxide contained in tail gas from a sulphite digesting process and making raw acid of a constant strength so as to eliminate ordinary adjustments in the flow of the burner gas to compensate for the fluctuations in flow of the tail gas, which consists in passing a variable flow of reclaimed gas counter-current and in contact with raw sulphite system acid so as to dissolve a portion of the sulphur dioxide contained in the reclaimed gas, passing the tail gas remaining from the above operation counter-current and in contact with fresh water so as to dissolve the residual sulphur dioxide and form an acidulated solution, passing the undissolved tail gas to the atmosphere, collecting the acidulated solution so as to produce a solution of substantially constant acid strength, and introducing said acidulated solution at a point below the liquor inlet of the raw acid making tower and intermediate the liquor inlet and outlet thereof.

WALTER H. SWANSON.
DONALD C. PORTER.